(12) United States Patent
Liu

(10) Patent No.: US 8,804,525 B2
(45) Date of Patent: Aug. 12, 2014

(54) METHOD AND DEVICE FOR NETWORK TRAFFIC CONTROL

(71) Applicant: Nan Liu, Shenzhen (CN)

(72) Inventor: Nan Liu, Shenzhen (CN)

(73) Assignee: Sangfor Networks Company Limited, Nanshan District, Shenzhen (CN)

(*) Notice: Subject to any disclaimer, the term of this patent is extended or adjusted under 35 U.S.C. 154(b) by 103 days.

(21) Appl. No.: 13/656,657

(22) Filed: Oct. 19, 2012

(65) Prior Publication Data

US 2013/0107714 A1 May 2, 2013

(30) Foreign Application Priority Data

Oct. 26, 2011 (CN) .......................... 2011 1 0329336

(51) Int. Cl.
*H04J 3/14* (2006.01)
*H04L 12/24* (2006.01)
*H04L 12/56* (2006.01)

(52) U.S. Cl.
CPC .......... *H04L 41/082* (2013.01); *H04L 47/2416* (2013.01)
USPC ............ 370/235; 370/230; 370/231; 370/232

(58) Field of Classification Search
None
See application file for complete search history.

(56) References Cited

U.S. PATENT DOCUMENTS

| | | | |
|---|---|---|---|
| 7,085,228 B2 * | 8/2006 | Zaki et al. | 370/229 |
| 7,336,613 B2 * | 2/2008 | Lloyd et al. | 370/237 |
| 7,643,418 B1 * | 1/2010 | Varier et al. | 370/232 |

* cited by examiner

*Primary Examiner* — Ian N Moore
*Assistant Examiner* — Latresa McCallum
(74) *Attorney, Agent, or Firm* — Global IP Services; Tianhua Gu

(57) ABSTRACT

A method and a device for network traffic control comprising the following steps: detecting actual downlink traffic of a network device; calculating an error e between the actual downlink traffic and predetermined downlink traffic; performing a calculation on the error to obtain PID output according to a PID control formula; calculating scaling of upstream traffic according to the calculated PID output and the downlink traffic; and regulating an upstream traffic threshold according to the scaling. The upstream traffic is increased or reduced in accordance with the actual downlink traffic be means of the correlated regulation and dynamic control of the upstream traffic and the downlink traffic of the network device. As such, traffic control is realized in those applications (e.g. UDP traffic such as P2P streaming media) which themselves lack the traffic control mechanism, and it is possible to make the best of network bandwidth as well.

8 Claims, 2 Drawing Sheets

METHOD AND DEVICE FOR NETWORK TRAFFIC CONTROL

CROSS REFERENCE TO RELATED PATENT APPLICATION

The present application claims the priority of the Chinese patent application No. 201110329336.9 filed on Oct. 26, 2011, which application is incorporated herein by reference.

FIELD OF THE INVENTION

The present invention relates to the network control field, and particularly relates to a method and device for network traffic control.

BACKGROUND OF THE UTILITY MODEL

According to statistics, P2P (peer-to-peer) data accounts for 60% of the total Internet traffic, and it shows a tendency of continuous increase. In enterprise and service provider networks, P2P traffic is hard to control and thus occupies much of the bandwidth resource, thereby causing great time delay and small speed occur in other network applications.

IP data stream on the network is mainly based on the TCP protocol (Transmission Control Protocol) or the UDP protocol (User Datagram Protocol). Wherein, the TCP protocol is one kind of reliable transmission protocol which has congestion control itself and is sensitive to network delay and packet loss. In conventional traffic control, TCP traffic can be controlled very well by usage of buffer delay and packet loss. However, with the development of the Internet, P2P traffic base on the UDP protocol is occupying more and more network bandwidth. Since its own congestion control is imperfect or absent for such UDP traffic, it is insensitive to time delay or packet loss. When employing a traditional method for traffic control, it is still difficult for senders to slow down the sending rate on its own even when UDP data is dropped. In this case, the continuous packet loss is a waste of the bandwidth in turn.

Regarding the traffic based on the TCP protocol, when a host sending data packet has detected the packet loss, it will slow down the sending rate to avoid congestion actively. Nevertheless, applications based on the UDP protocol such as a P2P streaming application will not slow the rate for packet loss due to the shortage of traffic control mechanism. Besides, the traditional traffic control method is incapable of controlling the external network traffic, and it causes a waste to the external network bandwidth for continuous packet loss. On the other hand, overranging traffic not only wastes the external network bandwidth, but also leads to small speed and great time delay of other applications since it occupies their bandwidth. In particular, if the P2P is out of control in an enterprise network, the bandwidth resource of some key businesses is always unable to be guaranteed, which further influences the normal business operation.

In the prior art, upstream bandwidth and downlink bandwidth are defined and controlled separately. Generally speaking, the network traffic control only focuses on the downlink bandwidth of the traffic, while the control object for the upstream bandwidth is always not clear. Moreover, the proportional relationship between the upstream and downlink bandwidths varis with the specific traffic characteristics, and the actual upstream traffic usually cannot reach the prescribed upstream bandwidth.

SUMMARY OF THE UTILITY MODEL

The objective of the present invention is to provide a method and system for network traffic control which can regulate the P2P traffic actively and make full use of the bandwidth to guarantee the bandwidth resource of key businesses, aiming at the problems that the P2P traffic in enterprise and service provider networks is hard to control and occupies much of the bandwidth resource to cause great time delay and small speed to other network applications in the prior art.

One technical solution employed to solve the technical problem of the present invention is as follows:

a method for network traffic control is provided, which comprises the following steps:

detecting actual downlink traffic of a network device;

calculating an error e between the actual downlink traffic and predetermined downlink traffic;

performing a calculation on the error to obtain PID output according to a PID (Proportion Integration Differentiation) control formula;

calculating scaling of upstream traffic according to the calculated PID output and the downlink traffic; and regulating an upstream traffic threshold according to the scaling.

In the method for network traffic control of the present invention, the PID control formula is a discrete one:

$$u(t) = u(kT) = k_p e(kT) + k_i \sum_{j=0}^{k-1} e(jT)T + k_d \frac{e(kT) - e(kT-T)}{T}$$

wherein t=kT, T is a discrete sampling period, k is a natural number, $k_p$ is a proportional coefficient, $k_i$ is an integration time constant and $k_d$ is a differential time constant.

In the method for network traffic control of the present invention, the method further comprises the step: providing an adaptive function for evaluating and controlling the error and smoothness, wherein the adaptive function is the weighted sum of the discrete coefficients of the error and jitter; and performing a periodic adaptive regulation on the three parameters $k_p$, $k_d$ or $k_i$ of the discrete PID control formula according to the values of the adaptive function, wherein the periodic adaptive regulation includes an addition or a subtraction operation.

In the method for network traffic control of the present invention, the scaling of the upstream traffic is as follows:

$$\text{tuning} = \frac{u(k)}{V_{obj}} \times \frac{\text{sensitive}}{100},$$

wherein $V_{obj}$ is the predetermined downlink traffic and sensitive is a regulation parameter operable to regulate sensitivity; when the error e is relatively great, increasing the sensitive, and when the error e decreases, reducing the sensitive.

In the method for network traffic control of the present invention, the method further comprises the step: regulating a predetermined downlink traffic threshold when the proportion of line load to line bandwidth reaches a predetermined value.

Another technical solution employed to solve the technical problem of the present invention is as follows:

a device for network traffic control is provided, comprising:

a traffic detector, which is operable to detect actual downlink traffic of a network device;

a difference calculator, which is operable to calculate an error e between the actual downlink traffic and predetermined downlink traffic;

a PID controller, which is operable to perform a calculation on the error to obtain PID output according to a PID control formula;

a scaling calculator, which is operable to calculate scaling of upstream traffic according to the calculated PID output and the downlink traffic; and an upstream traffic regulator, which is operable to regulate an upstream traffic threshold according to the scaling.

In the device for network traffic control of the present invention, the PID control formula used by the PID controller is a discrete one:

$$u(t) = u(kT) = k_p e(kT) + k_i \sum_{j=0}^{k-1} e(jT)T + k_d \frac{e(kT) - e(kT-T)}{T}$$

wherein t=kT, T is a discrete sampling period, k is a natural number, $k_p$ is a proportional coefficient, $k_i$ is an integration time constant and $k_d$ is a differential time constant.

In the device for network traffic control of the present invention, the device further comprises an adaptive regulator which is operable to provide an adaptive function to evaluate and control the error and smoothness, and then to perform a periodic adaptive regulation which includes an addition or a subtraction operation on the three parameters $k_p$, $k_d$ and $k_i$ of the discrete PID control formula accordingly; wherein the adaptive function is the weighted sum of the discrete coefficients of the error and jitter.

In the device for network traffic control of the present invention, the scaling of the upstream traffic in the scaling calculator is as follows:

$$\text{tuning} = \frac{u(k)}{V_{obj}} \times \frac{\text{sensitive}}{100}$$

wherein $V_{obj}$ is the predetermined downlink traffic and sensitive is a regulation parameter operable to regulate sensitivity; when the error e is relatively great, increasing the sensitive, and when the error e decreases, reducing the sensitive.

In the device for network traffic control of the present invention, the traffic detector is further operable to detect line load; the device for network traffic control further includes a downlink traffic regulator, which is operable to regulate a predetermined downlink traffic threshold when the proportion of the line load to line bandwidth reaches a predetermined value.

The advantageous effect achieved by the present invention is as follows: in the present invention, the error between the actual downlink traffic and the predetermined downlink traffic is utilized to calculate the PID output by means of the PID control formula; the scaling of the upstream traffic is calculated according to the calculated PID output and the downlink traffic, and the upstream traffic threshold is regulated based on the scaling. The upstream traffic is increased or reduced in accordance with the actual downlink traffic by means of the correlated regulation and dynamic control of the upstream traffic and the downlink traffic of the network device. As such, traffic control is realized in those applications (e.g. UDP traffic such as P2P streaming media) which themselves lack the traffic control mechanism, and it is possible to make the best of network bandwidth as well.

Furthermore, in order to make the PID parameters get close to an optimal combination gradually, the error and smoothness are evaluated and controlled by providing the adaptive function, and the periodic adaptive regulation which includes an addition or a subtraction operation is performed on the three parameters $k_p$, $k_d$ and $k_i$ of the discrete PID control formula based on the calculated values of the adaptive function. In this way, after a period of the adaptive process, such three parameters of PID can match the deployment environment of the current network so as to control the traffic accurately and smoothly.

Furthermore, when the proportion of the line load to the line bandwidth reaches a predetermined value, the predetermined downlink traffic threshold is regulated so that the corresponding traffic backoff is carried out to guarantee normal operations of some key businesses when they have been started.

BRIEF DESCRIPTION OF THE DRAWINGS

The present invention will be further described with reference to the accompanying drawings and embodiments in the following. In the figures.

DETAILED DESCRIPTION OF THE PREFERRED EMBODIMENT

In order to make the objective, technical solution and advantages of the present invention more clear, the present invention will be further explained in detail with reference to the accompanying drawings and embodiments in the following. It is understood that the specific embodiments described here are only for illustration instead of limitation of the present invention.

Figure 1:
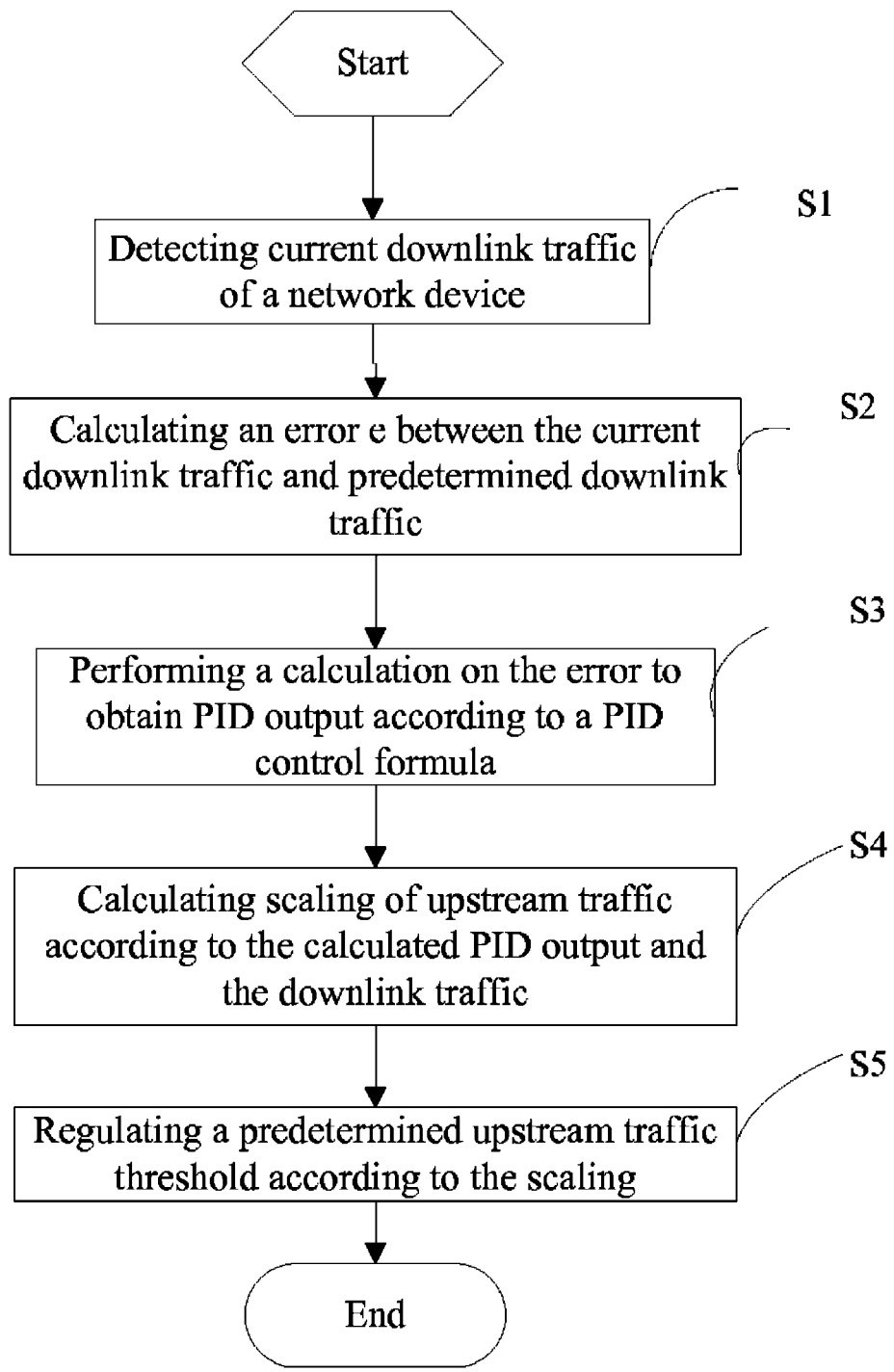
FIG. 1 is a flow chart of the method for network traffic control in an embodiment of the present invention.

In the present invention, in order to enhance the bandwidth utilization and ensure some kind of smooth key businesses fluency, a device for network traffic control (i.e. a traffic control device) is utilized to implement a correlated control between the upstream traffic and the downlink traffic of a network. As shown in FIG. 1, a method for network traffic control is provided, which comprises the following steps.

S1. Detect the actual downlink traffic of a network device by a traffic control device.

S2. Calculate the error e between the actual downlink traffic and a predetermined downlink traffic; wherein, an upstream traffic threshold and a downlink traffic threshold are usually set as required for the network device respectively.

S3. Perform a calculation on the error to obtain PID output according to a PID control formula; wherein, PID (Proportion Integration Differentiation) control formula is typically used in the industrial control field, while in the present invention, it is applied in the field of network traffic control so as to control the network traffic very well.

The initial algorithm formula of PID is $$u(t) = k_p e(t) + k_i \int_0^t e(\tau) d\tau + k_d \frac{de(t)}{dt},$$

wherein $k_p$ is a proportional coefficient, $k_i$ is an integration time constant and $k_d$ is a differential time constant. In such formula, the first monomial is used to perform a proportional calculation on the error e so as to match with the proportional relationship between a current input signal and an output signal; the second monomial is used to perform an integration calculation on the error e so as to eliminate the accumulated error in the past; and the third monomial stands for a differential calculation used for predicting the variation trend in the future.

In the embodiment of the present invention, it is needed to employ a discrete PID algorithm since it is applied in a digital system. For this purpose, it is set that t=kT, wherein T is a discrete sampling period and k is a natural number. Accordingly, a discrete PID algorithm formula is obtained as follows:

$$u(t) = u(kT) = k_p e(kT) + k_i \sum_{j=0}^{k-1} e(jT)T + k_d \frac{e(kT) - e(kT-T)}{T}$$

With regard to the discrete typed one, historical errors are required to be stored for integration, and it is easy to cause some mutation during calculating the directly produced u(kT), which further results in severe system jitter. In an embodiment of the present invention, the discrete PID increment calculation can be used to avoid the sever system jitter. A following discrete PID increment formula can be obtained when taking T=1 as the sampling period:

$$\Delta u(k) = u(k) - u(k-1) = (k_p + k_i + k_d) e(k) - (k_p + 2k_d) e(k-1) + k_d e(k-2);$$

wherein, an initial value of u(kT) is firstly figured out depending on the proportion of the error; subsequently, the value of u(kT) is updated according to the increment Δu(kT) obtained from the calculation of u(kT) every time.

S4. Calculate the scaling of the upstream traffic according to the calculated PID output and the downlink traffic. In an embodiment of the present invention, the scaling formula for the upstream traffic is $$\text{tuning} = \frac{u(k)}{V_{obj}} \times \frac{\text{sensitive}}{100},$$

wherein $V_{obj}$ is the predetermined downlink traffic and sensitive (which is usually an integer from 1 to 100) is a regulation parameter operable to regulate sensitivity. In order to enhance the stability of the network traffic, the sensitive is correspondingly increased when the error e is relatively great, and it is correspondingly reduced when the error e decreases.

S5. Regulate the upstream traffic threshold according to the scaling calculated in step S4. In the embodiment of the present invention, the above-mentioned scaling formula is used for the correlated regulation between the upstream traffic and the downlink traffic. In detail, the problem that a specific control object for upstream bandwidth is absent is solved firstly, and the traffic control is realized in those applications which themselves lack the traffic control mechanism (e.g. UDP traffic such as P2P streaming media). In this way, the upstream traffic is increased or reduced in accordance with the actual downlink traffic by means of the correlated regulation and dynamic control of the upstream traffic and the downlink traffic in the present invention. As long as the quantitative relationship between the upstream traffic and the downlink traffic is coordinated, the problem that the existing traffic control technology fails to control the P2P traffic in the prior art is solved.

Further, in order to evaluate the control effect of the traffic control device and make such device match with the deployed network environment in a smart and better way, an adaptive function is provided for evaluating and controlling the error and smoothness. The adaptive function fitness can be expressed in the weighted sum of a discrete coefficient of the error error_cv and a discrete coefficient of the jitter jitter_cv. The adaptive function is as follows:

fitness=error_cv×error_weight+jitter_cv×jitter_weight wherein error_weight+jitter_weight=1, and such two weights can be distributed depending on the error and the smoothness required by a target network.

The quantitative relationship between the upstream traffic and the downlink traffic varies with the network environment and the network application. Therefore, when the correlated regulation is implemented for such two kinds of traffic, a closed-loop control algorithm is necessary and its parameters should be regulated adaptively to match with the network environment. PID algorithm is one kind of mature closed-loop control algorithm, the key points of which lie in the selection of its proportion, integration and differentiation parameters. The network traffic control has unique individual differences in different deployment scenarios, while the individual characteristic does not converge into a group one. The selection of the three PID parameters $k_p$, $k_d$ and $k_i$ can be regulated adaptively on the basis of some empirical values. In every period of regulation, an addition or a subtraction operation is performed on the three parameters $k_p$, $k_d$ and $k_i$ of the discrete PID control formula. When such period comes to an end, the value of the adaptive function fitness is calculated. If the reduction of the fitness represents a better regulation effect, the current regulated parameters will be continued to increase or decrease in a next period. Instead, if the increase of the fitness represents a worse regulation effect, the regulation is rolled back to the last one and the initial regulation is reversed accordingly (i.e. an addition operation is changed into a subtraction one, vice versa), or else another parameter is provided to continue regulating. The periodic regulation makes the PID parameters get close to an optimal combination gradually. In this way, after a period of the adaptive process, such three parameters of PID can match the deployment environment of the current network so as to control the network traffic accurately and smoothly.

Further, in order to make full use of the idle bandwidth and give back the bandwidth to some key businesses, a predetermined downlink traffic threshold is regulated when the proportion of the line load to the line bandwidth reaches a predetermined value. For example, in certain enterprise network environments, P2P traffic and some other traffic are allowed to occupy more bandwidth when the bandwidth resource is relatively idle so as to make full use of the bandwidth resource. However, once the key businesses are started, it is possible for the P2P traffic and some other traffic to give back the bandwidth so as to achieve a smooth operation of the key businesses. In the embodiment of the present invention, the bandwidth usage can be controlled flexibly by the following steps: regulating the downlink traffic threshold $V_{obj}$ of P2P traffic and some other traffic by monitoring the line load, and re-calculating the scaling of the upstream traffic automatically. For instance, minimum and maximum bandwidths of P2P applications can be set to be min_bw and max_bw respectively. The $V_{obj}$ can be regulated according to the line load as follows:

$$V_{obj2} = \frac{V_{obj1} \times 3 + \min\_bw}{4} \quad (1)$$

when the line load is above 90% of the line bandwidth;

$$V_{obj2} = \frac{V_{obj1} \times 3 + \max\_bw}{4} \quad (2)$$

when the line load is below 80% of the line bandwidth; wherein $V_{obj1}$ stands for an initial downlink traffic threshold provided previously and $V_{obj2}$ stands for a regulated downlink traffic threshold after regulation.

The idle bandwidth can be utilized and some bandwidth can be given back to the key business by means of the iteration adaptation of the downlink traffic threshold $V_{obj}$.

Figure 2:
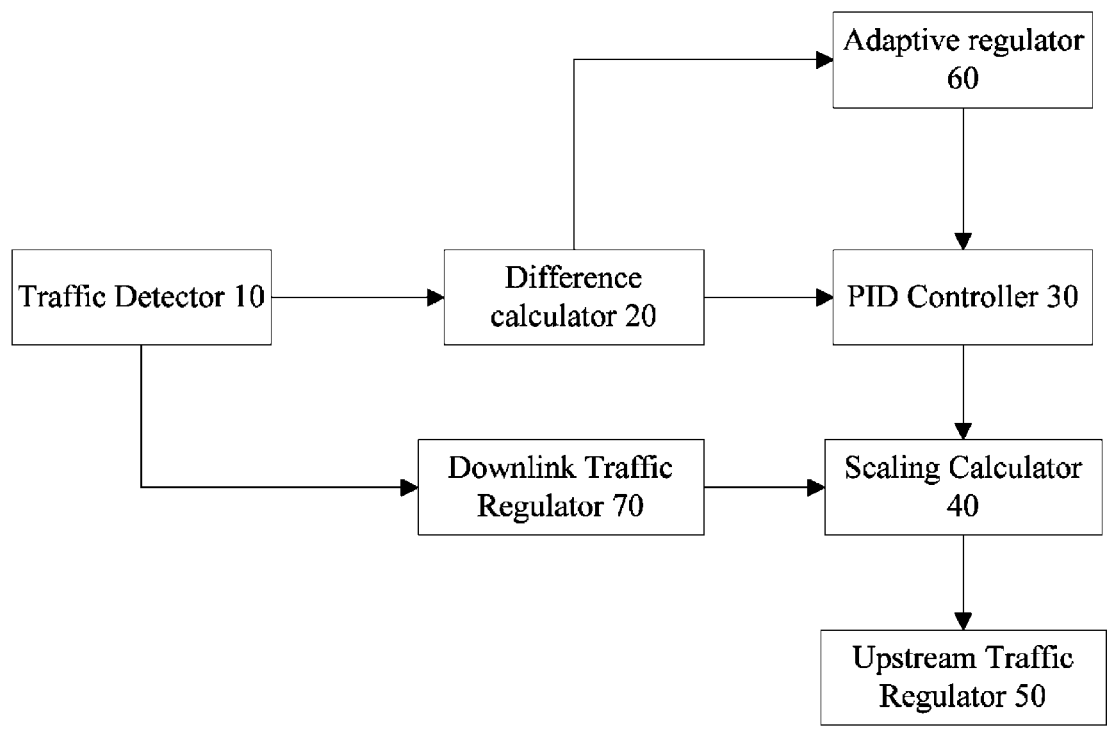
FIG. 2 is a structural diagram of the device for network traffic control in an embodiment of the present invention.

As shown in FIG. 2, the device for network traffic control in the embodiment of the present invention mainly comprises a traffic detector 10, a difference calculator 20, a PID controller 30, a scaling calculator 40 and an upstream traffic regulator 50.

Specifically, the traffic detector 10 is operable to detect actual downlink traffic of a network device.

The difference calculator 20 is operable to calculate an error e between the current downlink traffic and predetermined downlink traffic.

The PID controller 30 is operable to perform a calculation on the error to obtain PID output according to a PID control formula. In the embodiment of the present invention, the PID control formula used by the PID controller 30 is a discrete one:

$$u(t) = u(kT) = k_p e(kT) + k_i \sum_{j=0}^{k-1} e(jT)T + k_d \frac{e(kT) - e(kT - T)}{T}$$

wherein t=kT, T is a discrete sampling period, k is a natural number, $k_p$ is a proportional coefficient, $k_i$ is an integration time constant and $k_d$ is a differential time constant.

The scaling calculator 40 is operable to calculate scaling of upstream traffic according to the PID output obtained by the calculation of the PID controller 30 and the downlink traffic. In the embodiment of the present invention, the scaling of the upstream traffic in the scaling calculator is shown as follows:

$$\text{tuning} = \frac{u(k)}{V_{obj}} \times \frac{\text{sensitive}}{100},$$

wherein $V_{obj}$ is the predetermined downlink traffic and sensitive is a regulation parameter operable to regulate sensitivity. The sensitive is correspondingly increased when the error e is relatively great, and it is correspondingly reduced when the error e decreases.

The upstream traffic regulator 50 is operable to regulate an upstream traffic threshold according to the scaling. In the embodiment of the present invention, the above-mentioned scaling formula is used for the correlated regulation between the upstream traffic and the downlink traffic, and the problem that the existing traffic control technology fails to control the P2P traffic is solved. The specific regulation mode has been described above in detail, which is thus not repeated here.

Further, in order to evaluate the control effect of the traffic control device and make such device match with the deployed network environment in a smart and better way, the traffic control device is provided with an adaptive regulator 60, which is used to set an adaptive function for evaluating and controlling the error and smoothness and perform a periodic adaptive regulation on the three parameters $k_p$, $k_d$ and $k_i$ of the discrete PID control formula according to the calculation results of the adaptive function. The adaptive function is the weighted sum of the discrete coefficients of the error and jitter, wherein the two weights can be distributed depending on the error and the smoothness required by a target network. In this way, after a period of the adaptive process, such three parameters of PID can match the deployment environment of the current network.

Further, in order to make full use of the idle bandwidth and give back the bandwidth to some key businesses, a predetermined downlink traffic threshold may be regulated when the proportion of the line load to line bandwidth reaches a predetermined value. In an embodiment of the present invention, the traffic detector 10 is further operable to detect line load, that is, the actual network bandwidth used by the line. The device for network traffic control further includes a downlink traffic regulator 70, which is operable to regulate a predetermined downlink traffic threshold when the proportion of the line load to line bandwidth reaches a predetermined value, so that the idle bandwidth can be utilized and some bandwidth can be given back to the key business.

It should be understood that some improvements or modifications may be implemented according to the above-mentioned description for those skills in the art. All these improvements and modifications should be within the scope of protection of the appended claims in the present invention.

What is claimed is:

1. A method for network traffic control at a network device, comprising the following steps:
    detecting actual downlink traffic of the network device;
    calculating, at a difference calculator, an error e between the actual downlink traffic and predetermined downlink traffic;
    performing a calculation on the error to obtain PID output according to a PID (Proportion Integration Differentiation) control formula;
    calculating scaling of upstream traffic according to the calculated PID output and the downlink traffic; and
    regulating an upstream traffic threshold according to the scaling; wherein the PID control formula is a discrete one:

$$u(t) = u(kT) = k_p e(kT) + k_i \sum_{j=0}^{k-1} e(jT)T + k_d \frac{e(kT) - e(kT - T)}{T},$$

wherein t=kT, T is a discrete sampling period, k is a natural number, $k_p$ is a proportional coefficient, $k_i$ is an integration time constant and $k_d$ is a differential time constant.

2. The method for network traffic control of claim 1, wherein the method further comprises the step: providing an adaptive function for evaluating and controlling the error and smoothness, wherein the adaptive function is the weighted sum of the discrete coefficients of the error and jitter; and performing a periodic adaptive regulation on the three parameters $k_p$, $k_d$ and $k_i$ of the discrete PID control formula according to the values of the adaptive function, wherein the periodic adaptive regulation includes an addition or a subtraction operation.

3. The method for network traffic control of claim 2, wherein the scaling of the upstream traffic is as follows:

$$\text{tuning} = \frac{u(k)}{V_{obj}} \times \frac{\text{sensitive}}{100},$$

wherein $V_{obj}$ is predetermined downlink traffic and sensitive is a regulation parameter operable to regulate sensitivity; when the error e is relatively great, increasing the sensitive, and when the error e decreases, reducing the sensitive.

4. The method for network traffic control of claim 3, wherein the method further comprises the step: regulating a predetermined downlink threshold when the proportion of line load to line bandwidth reaches a predetermined value.

5. A device for network traffic control, wherein comprising:
- a traffic detector, which is operable to detect actual downlink traffic of a network device;
- a difference calculator, which is operable to calculate an error e between the actual downlink traffic and predetermined downlink traffic;
- a PID controller, which is operable to perform a calculation on the error to obtain PID output according to a PID control formula;
- a scaling calculator, which is operable to calculate scaling of upstream traffic according to the calculated PID output and the downlink traffic; and
- an upstream traffic regulator, which is operable to regulate an upstream traffic threshold according to the scaling;

wherein the PID control formula used by the PID controller is a discrete one:

$$u(t) = u(kT) = k_p e(kT) + k_i \sum_{j=0}^{k-1} e(jT)T + k_d \frac{e(kT) - e(kT-T)}{T},$$

wherein t=kT T is a discrete sampling period, k is a natural number, $k_p$ is a proportional coefficient, $k_i$ is an integration time constant and $k_d$ is a differential time constant.

6. The device for network traffic control of claim 5, wherein the device further comprises an adaptive regulator which is operable to providing an adaptive function to evaluate and control the error and smoothness, and then to perform a periodic adaptive regulation which includes an addition or a subtraction operation on the three parameters $k_p$, $k_d$ and $k_i$ of the discrete PID control formula regularly accordingly; wherein the adaptive function is the weighted sum of the discrete coefficients of the error and jitter.

7. The device for network traffic control of claim 6, wherein the scaling of the upstream traffic in the scaling calculator is as follows:

$$\text{tuning} = \frac{u(k)}{V_{obj}} \times \frac{\text{sensitive}}{100},$$

wherein $V_{obj}$ is predetermined downlink traffic and sensitive is a regulation parameter operable to regulate sensitivity; when the error e is relatively great, increasing the sensitive, and when the error e decreases, reducing the sensitive.

8. The device for network traffic control of claim 6, wherein the traffic detector is further operable to detect line load; the device for network traffic control further includes a downlink traffic regulator, which is operable to regulate a predetermined downlink threshold when the proportion of the line load to line bandwidth reaches a predetermined value.

\* \* \* \* \*